United States Patent [19]

Rasmussen

[11] 4,115,502
[45] Sep. 19, 1978

[54] EXTRUSION METHOD INVOLVING ROTATIONS

[76] Inventor: Ole-Bendt Rasmussen, 14, Anemonevej, 2820 Gentofte, Denmark

[21] Appl. No.: 639,006

[22] Filed: Dec. 9, 1975

[51] Int. Cl.² .............................................. B29F 3/10
[52] U.S. Cl. .................... 264/173; 156/167; 156/172; 156/173; 156/175; 156/244.12; 264/209; 425/133.1
[58] Field of Search .................... 264/171–173, 264/176 R, 209, 349, 280, 176 C, 310–312; 156/172, 173, 175, 167, 244; 425/133.1, 376 B, 462, 380

[56] References Cited

U.S. PATENT DOCUMENTS

| | | | |
|---|---|---|---|
| 2,977,632 | 4/1961 | Bonch | 425/380 |
| 3,129,460 | 4/1964 | Berger | 425/380 |
| 3,153,688 | 10/1964 | Marshall | 264/349 |
| 3,193,604 | 7/1965 | Mercer | 264/209 |
| 3,205,289 | 9/1965 | Carpenter | 264/280 |
| 3,277,528 | 10/1966 | Nikiforov | 264/176 C |
| 3,443,277 | 5/1969 | Frielingsdorf | 264/171 |
| 3,558,755 | 1/1971 | Laban et al. | 264/171 |
| 3,565,985 | 2/1971 | Schrenk et al. | 264/171 |
| 3,649,147 | 5/1972 | Fritsch | 425/170 |
| 3,784,339 | 1/1974 | Springfeld | 425/133.1 |
| 3,966,861 | 6/1976 | Papesh et al. | 264/209 |

*Primary Examiner*—Jeffery R. Thurlow
*Attorney, Agent, or Firm*—William J. Daniel

[57] ABSTRACT

One or several strands of a material in plastic state are laid in pressure free fashion into an exposed exteriorly accessible circular exterior inlet channel of an extrusion die, while at least the diepart or dieparts, which define the inlet orifice are rotated so as to lay each strand generally helically in the channel, and a driving shear force is applied against the material in the inlet channel to advance the material towards the die orifice, from where it is extruded in form of a tubular film or a circular array of filamentituous elements. The driving shear force can be established by rollers or scrapers engaging with the inlet orifice, or by moving the two sides of the inlet orifice relative to each other preferably in connection with an internal vanes adapted to produce a pumping action, or by an inserted ring in the orifice.

13 Claims, 5 Drawing Figures

EXTRUSION METHOD INVOLVING ROTATIONS

BACKGROUND OF THE INVENTION

The present invention relates to the extrusion of a tubular item or a circular array of filamentous items from any material formable by extrusion. Thus it covers the extrusion of a great variety of end products, such as e.g. tubular film, pipes, twine, rope material and textile yarn from thermoplastic polymers, but also e.g. extruded foodstuff, glass and ceramic articles.

An object of the invention is to achieve improved circumferential distribution in the extrusion of tubular structures or circular arrays of filaments or the like, in particular in connection with materials which due to great deviation from Newtonian behaviour are difficult to distribute evenly over the circumference by conventional means, or in connection with coextrusion.

As known it is relatively easy to carry out an even coextrusion of e.g. 4–5 layers in a flat die, because the spacing of each of the internal slots for the different materials can be adjusted at small intervals, but similar simple adjustment means do not exist for tubular coextrusion. Therefore there is a great need for devising an improved distribution system in connection with circular coextrusion.

A second object of the present invention is to provide for a simple method and device for coextrusion of a relatively large number of layers.

A third object is to mechanically improve the bonding between layers of different coextruded materials by forming fine ribformed mutually interspersed extensions of the layers.

Other objects of the invention wll appear from the following description.

SUMMARY OF THE INVENTION

The present invention which as mentioned above relates to the extrusion of a tubular item or a circular array of filamentous items from any material formable by extrusion in plastic state, is characterized by the steps of feeding (usually from a conventional extruder) at least one strand of the material in plastic state into a circular inlet orifice of an extrusion die, distributing the material evenly over the circumference of the inlet orifice by rotation of the material around the central axis of said circular orifice, creating a driving shear force at said orifice, and hereby extruding the material to an exit part of the die while maintaining it in form of a tubular stream or a circular array of streams.

The rotation of the material in the inlet orifice will lay-up each strand in helical manner and will thereby produce an even distribution over the circumference. At the same time the die itself will work as melt-fed extruder.

As it will appear more clearly from the drawings and the description of the latter, there is no need to establish a sealed-off connection between the apparatus part from which the strand or strands are fed into the inlet orifice and the rotating diepart or dieparts which surround this orifice. If further a similar rotation at the exit is allowable, any use of sealed revolving connections between conduits carrying the plastic material can therefore be avoided. However, in most cases a rotation of a die exit for the described kind of structures is even preferable. Thus a tubular film, as known is often hauled off from the circular die under a relative rotation between the die and the take-up means. Further, when producing an array of filaments, a twist will often be advantageous. Consequently, it will usually be preferable to maintain the rotation or rotations from inlet to outlet of the die, as shown in each of the drawings. However, it is also within the scope of the invention to keep the exit part fixed and therefore use one or several revolving and sealed joins between different parts of the die.

Depending e.g. on the flow-properties of the extruded material, different steps can be preferable to set-up the driving shear force at the inlet orifice, e.g.:

(a) a rolling or scraping action against the inlet slot, cf. FIG. 1.

(b) by forming at least the inlet orifice of the conduit system from two parts which are rotated relative to each other (at the same time as there is produced an overall rotation of the material in one direction) and supplying the surface of at least one of said rotating parts in engagement with the material with corrugations (vanes) adapted to the pumping action (directed obliquely with respect to the tangency)—cf. FIG. 3.

(c) similar to point (b) but with use of the well-known effect that a visco-elastic material under rotational shear between disks tends to drag towards the axis of the disks due to the elastic forces created by the shear. In this case the corrugations (vanes) of point (b) are unnecessary, but it is a must that the passageway leads generally inwardly in the zone under shear and that the material used is visco-elastic.—c.f. FIG. 4.

(d) by an insert (e.g. ringformed) in the inlet orifice relative to which one or both surfaces of the inlet orifice rotate, cf. FIG. 5. The insert and/or orifice surface(s) can be supplied with corrugations (vanes) in analogy with point (b) above or there can be made use of the effect described in point (c) above.

When extruding tubular items and using relative rotations as described under points (b) or (c) it is generally preferable to form the whole die of two parts moving relative to each other from inlet to exit of the conduit. In these embodiments the constructon of the die is particularly simple.

It is of course necessary to adjust to each other, on one hand the velocity by which the material is fed to the die (normally from a conventional extruder) and on the other hand the velocity of the rotation or rotations which cause the pumping of material through the die. Within limits however, there is a selfcontrolling effect in the means described above under (a)–(d). Thus—to take (b) as an example—the more the inlet orifice is filled with material, the greater will be the portion of the corrugations (vanes) which are covered with material and which therefore participate in the pumping action.

As mentioned in the introduction the present invention has particular advantages in connecton with coextrusion of different materials. If the latter exhibit very different flow properties, or e.g. if it is necessary to extrude a more viscous material near the surfaces and a less viscous material in the core of a tubular item, then it may be necessary to use a die with two or more conduit systems, either with a common exit orifice as shown in FIG. 1, or with separate exit orifices as shown in FIG. 2.

However, a preferable embodiment is characterized in feeding at least two different coextrudable materials to one inlet orifice as distinct strands and maintaining a generally laminar flow through the die. Said strands may with advantage have been joined to one composite strand before the feeding into the inlet orifice.

In order to utilize this embodiment for the formation of a laminate in the usual sense at least one strand of one of the materials is distributed and merged into one layer in the inlet orifice, and at least one stream of a different material is helically distributed and merged to another layer, said layers being generally continuous both in the circumferential and the longitudinal direction of the extrusion. It will be understood that this method—which is shown in FIG. 4—enables a simple coextrusion of many layers in a compact extrusion device.

In a further development of this method to produce a true laminate, different materials forming adjacent layers are fed in alternate relationship at the boundaries between the layers to form ribformed, mutually interspersed extensions of each layer in said boundaries. (See again FIG. 4, where the pattern at the feeding pipe (29) shows the interspersing). There is hereby provided an improved bonding by mechanical means.

The present invention also relates to the device for carrying out the methods described in the foregoing. This is an extrusion die comprising a circular inlet orifice, a circular exit orifice or a circular array of exit orifices, generally coaxial with the inlet orifice, a generally annular conduit or circular array of conduits also generally coaxial with the inlet orifice, and connecting said inlet and said outlet means to feed at least one strand of material in plastic state into said inlet orifice, means to rotate this orifice on the whole, means at the inlet orifice to produce a driving force towards the exit, and means to haul-off the extruded material from the exit.

In a preferable embodiment of the device, both sides of the inlet orifice are adjacent to a convex circular surface of the die. This is particularly practical, since the elastic forces by the winding of the strand around the device then helps to place the strand properly in the orifice (provided the strand consists of visco-elastic material).

Another preferred embodiment of the device according to the invention is characterized in that the whole conduit system from the inlet orifice to and including the exit orifice forms an annular passageway without any connecting links passing from wall to wall through said passageway. Die-lines in the extruded tubular item is hereby avoided, with a higher strength resulting.

BRIEF SUMMARY OF THE DRAWINGS

The invention will now be explained in further detail with reference to FIGS. 1-5, which schematically show five different embodiments of the extrusion device in perspective view with partial sections.

Figure 5:
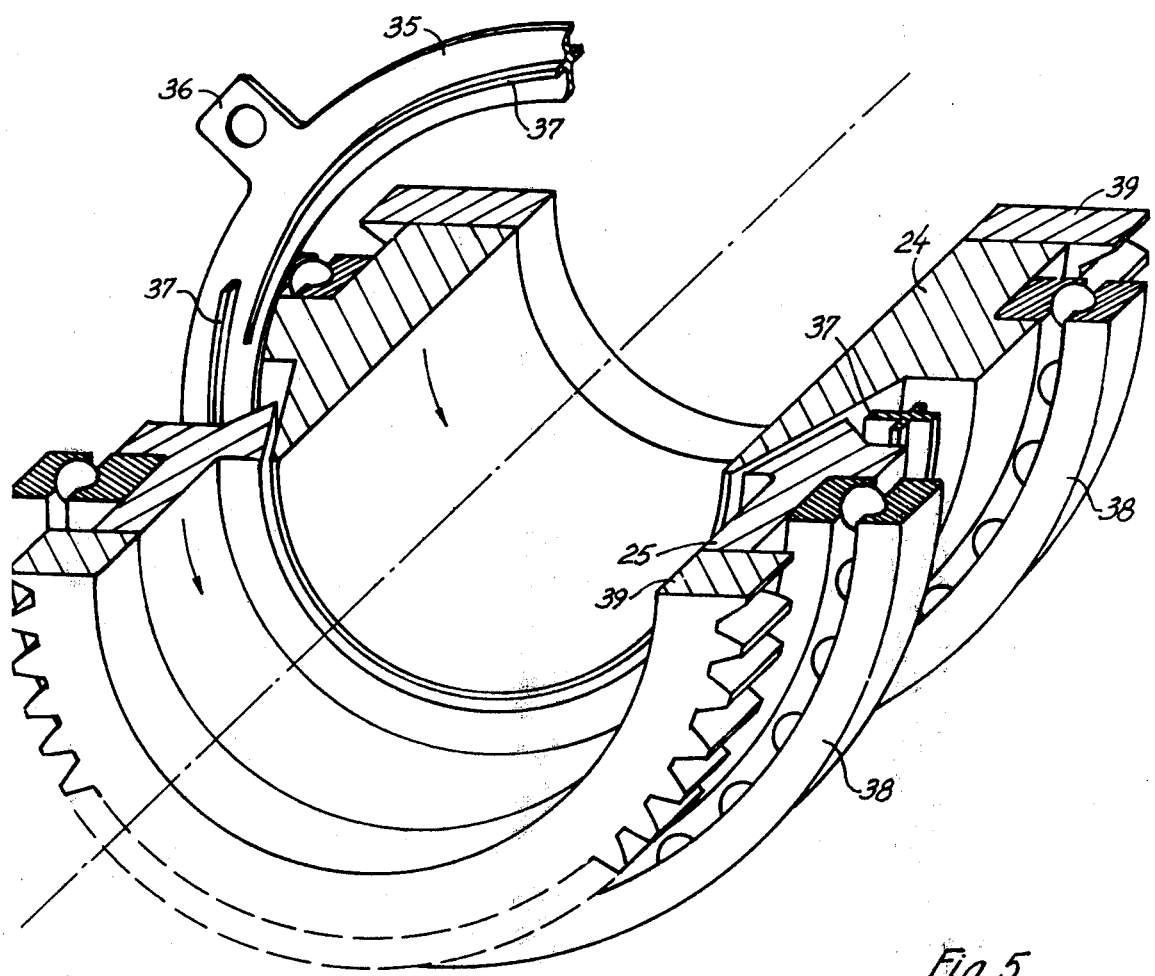

For the sake of clarity all heating means have been omitted, while bearings and driving means are shown only in FIG. 5.

DESCRIPTION OF THE DRAWINGS

Figure 1:
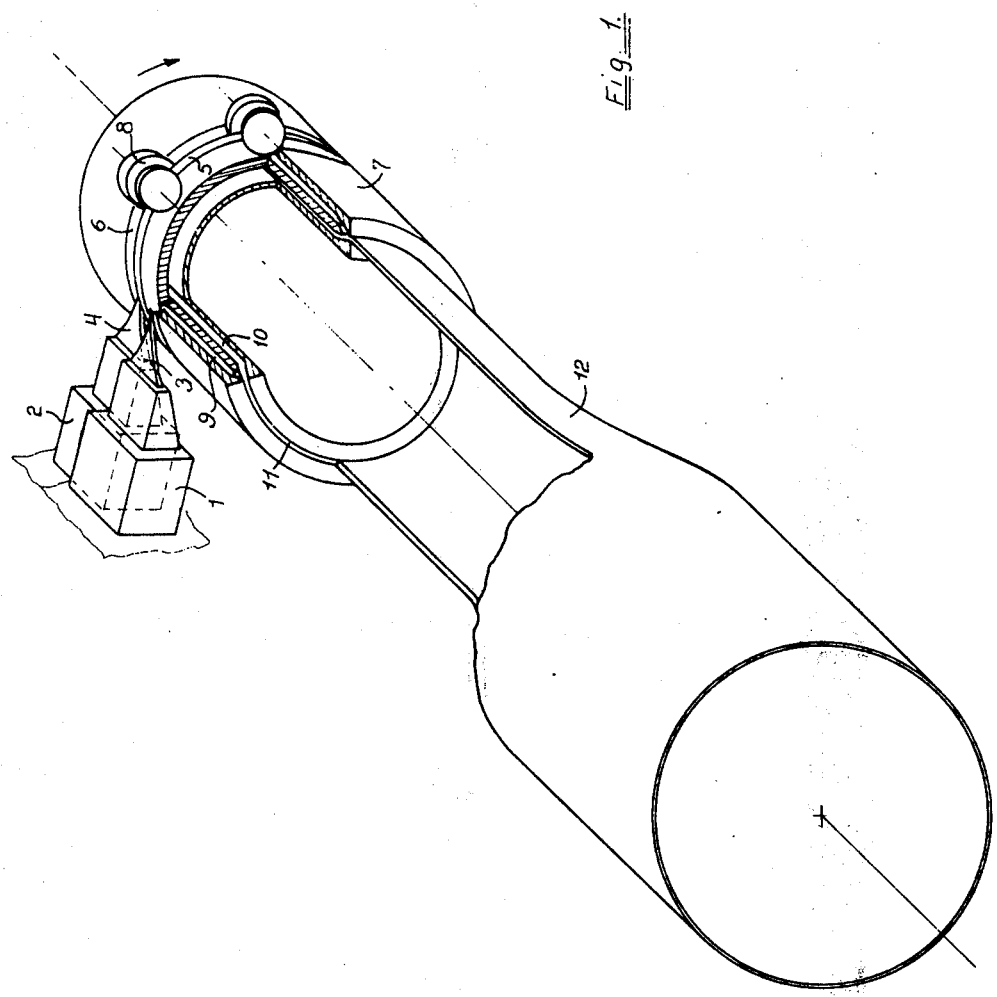
FIGS. 1, 3, 4, and 5 illustrate four different pumping means for the transport of plastic material through the die, while FIGS. 1, 2 and 4 further illustrate three different ways of joining different materials to a coextrudate. It is to be understood that each of the four pumping means can be combined with each of the three ways of coextruding.

In FIG. 1 the two extruder exits 1 and 2 feed two streams (in the above called "strands") of molten polymer material 3 respectively 4 into circumferential grooves or channels 5 and 6 forming the inlet orifices of a co-extrusion die 7. Several sets of rollers 8 run into the grooves and are provided with adjusting means (not shown) are placed in the rear end of the channels 9 and 10 through which the two polymer streams are led. The streams are united immediately before the exit orifice 11. Then the film 12 is blown and cooled in known manner and taken-up e.g. through nip-rollers (not shown).

The extrusion die itself can conveniently be heated by induction and its temperature controlled by pyrometers, while the rollers 8 can be heated by means of a cyclotherm.

The rollers 8 can be substituted by scrapers (also heated). Further it is easy to visualize that the circular exit orifice of the die can be substituted by a circular row of orifices by which there is formed an array of bi-stranded filaments, which array is twisted to a twisted yarn due to the rotation of the die.

Figure 2:
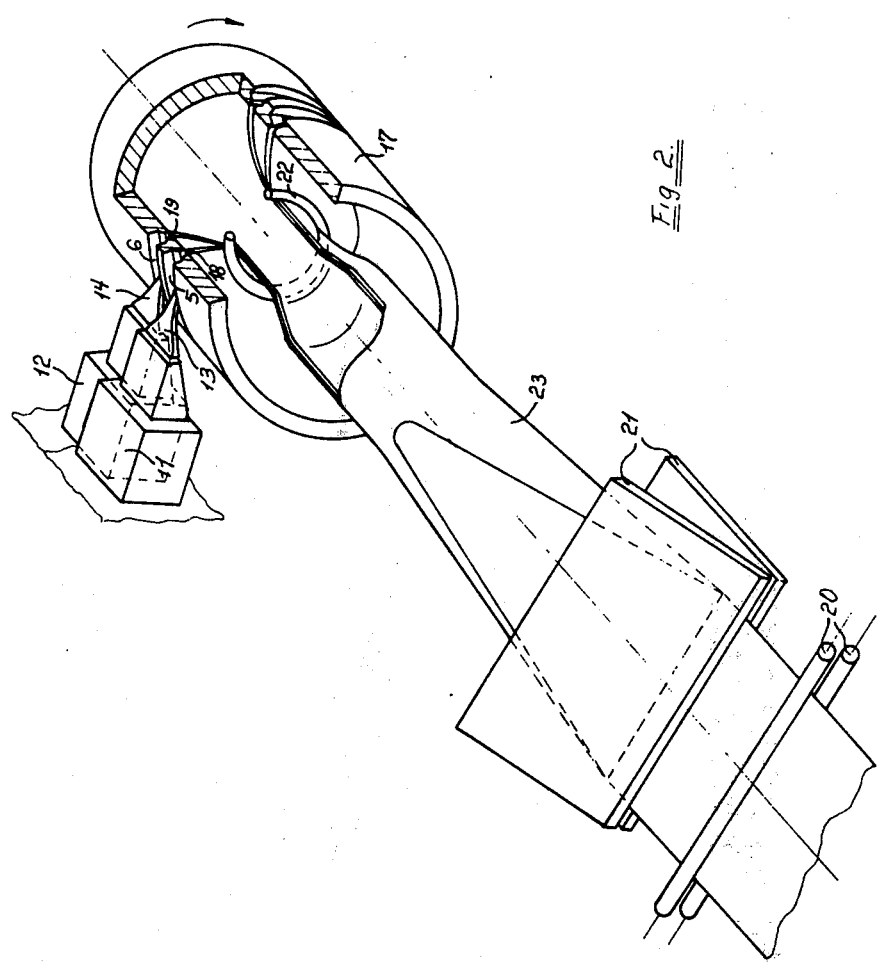

In FIG. 2 two extruder exits 11 and 12 feed polymer streams 13 respectively 14 into circumferential grooves 15 and 16 in an extruder-die 17. Rollers or other guiding and/or adjusting devices are not shown but are preferably applied. Spacers (not shown) must be placed in the grooves 15 and 16 that go inwardly and end in separated circumferential exit slots 18 and 19. The two polymer streams are drawn, as indicated as an example, by nip-rollers 20 through guiding plates 21 over a cooled ring 22, and simultaneously laminated to a film 23 that is cooled (not shown). Heating is carried out as explained above.

Figure 3:
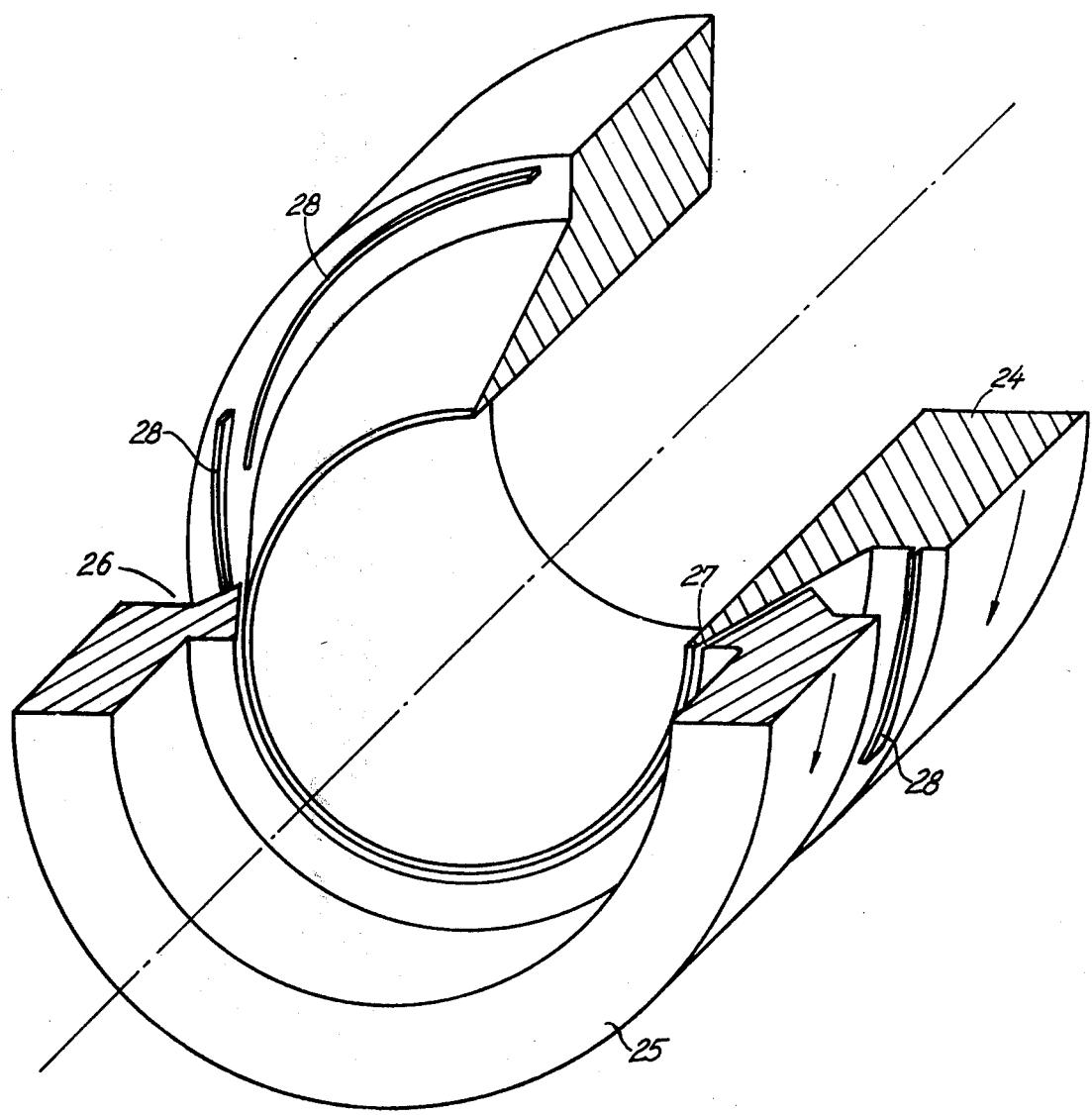

While it is expected that the rolling or scraping action described in connection with FIG. 1 is especially efficient in connection with material of particularly low fluidity, e.g. very high molecular weight polymers, the device of FIG. 3 is prefered in many other cases due to its simplicity. The die consists of two unconnected parts 24 and 25 which define a conduit consisting of the inlet orifice 26 and in direct connection herewith the exit orifice 27. (There may however conveniently be a longer passageway between the inlet and exit comprising one or several widened chambers for further improvement of the material distribution). The two parts 24 and 25 are held in position and with the proper spacing from each other through external bearings and are driven at different velocities through gear wheels (for details regarding the arrangement of bearings and gear wheels: see FIG. 5). The different velocities are indicated by the two arrows of different length. In order to achieve an efficient pumping action, the walls of the inlet orifice 26 are supplied with suitable vanes 28 which here are only shown on one of the parts.

By similar means as shown in FIGS. 1 and 2 (but not shown here) a stream (strand) of molten polymer is fed into the inlet orifice 26 and a tubular film is taken off from the exit orifice 27. Also in this embodiment the heating of the die can be by induction, but due to the simplicity and compactness of the construction it is even possible to use open flames.

At the same time as the two parts 24 and 25 move relative to each other, it is essential that the material fed into the die is rotated on the whole in order to become properly distributed. The arrows indicate that they rotate at different velocities in the same direction. It is also allowable to let one stand still, or even to rotate the two parts in opposite directions, however, with different numerical velocities so that the material on the average is always rotated in one direction.

Figure 4:
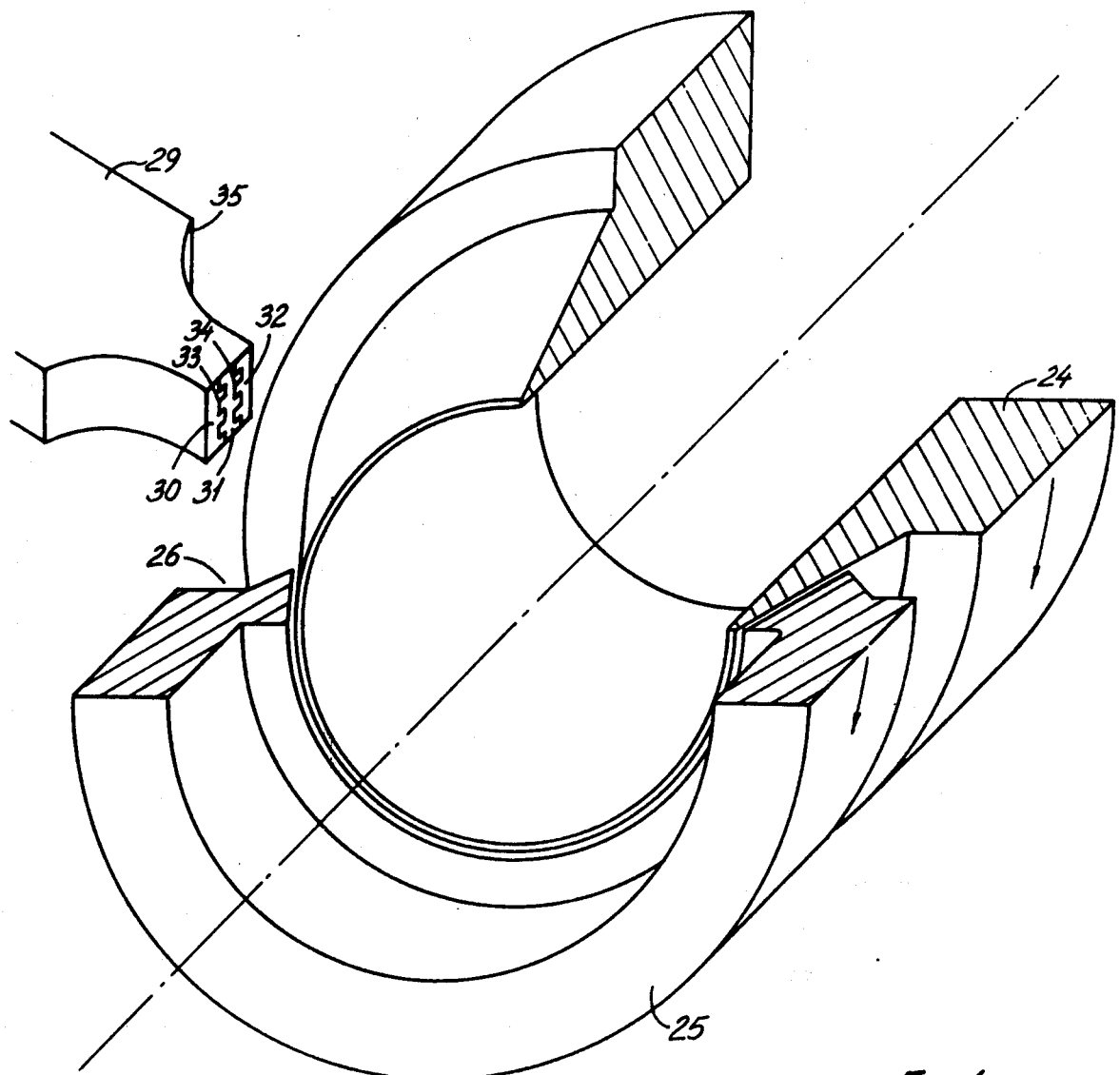

In FIG. 4 the rotating extrusion device is the same as in FIG. 3 except that the vanes 28 are omitted. As known from conventional disk-extruders, a differential velocity of the two parts 24 and 25 will produce a pumping effect in visco-elastic material due to the fact that the shearstresses have a component directed inwardly.

FIG. 4 further illustrates a very practical and efficient way of producing a laminate, in this case with three plies. Three different materials from three different extruders (not shown) are joined and extruded from a common die 29 as a composite strand (rod or filament) consisting of the three sub-strands (plies) 30 31 and 32. Due to the rotation of the two die parts 24 and 25 the composite strand is spirally wound-up in the orifice 26 with the ply 30 adjacent to part 24 and 31 in the middle. By the spiral winding-up and the continuous forewarding of the material, each of the sub-strands 30 31 and 32 will thereby merge with itself to a tubular ply. Instead of using only one coextrusion die 29 it can be advantageous to use two or more similar dies extruding the three materials in the same succession and mutually adjusted so that there are formed three merged plies of multi-spiral configuration.

A special feature of the coextrusion die 29 is means to form corrugated boundaries 33 and 34 between the three sub-strands, or in other words to intersperse the components with each other at their boundaries. This is obtained when the die-plates which separate the three streams of material have a zig-zagging cross-section as shown. However, the corrugated die-plates need not extend to the exit of the die 29 but can be located far backward in this die e.g. before this is necked-in at 35.

The composite strand consisting of the plies 30, 31 and 32 is preferably substantially drawn-down in the free space between the exit of 29 and the orifice 26. The dimensions of the corrugations at the boundaries of the plies will hereby be reduced, and it will be easy to get them down to a microscale, e.g. between 1 and 100 microns. In the final product these regular corrugations will essentially improve the bonding between the plies in cases when the adhesive bond as such is poor.

In case the adhesive bond as such is satisfactory, there will not be any need to intersperse the plies at their boundaries.

The drawing only shows three plies, but it is a relatively simple matter to coextrude even a great number of plies side-by-side in the die 29— particularly when the plies are joined to one stream before the necking-in at 35.

The joining of the different materials to one composite strand before they are fed into the inlet orifice 26 is not indispensable but will usually be preferable in order to achieve the most precise merging of each of the plies to one tubular layer.

It is not necessary to use plain surfaces of the conduits of parts 24 and 25. There may be driving corrugations (vanes) but relatively low or shallow. The driving system of rollers or scrapers, cf. FIG. 1, is also applicable but in any case a generally laminar flow must be secured to produce and maintain the layers.

In special cases there can be advantages in producing a blended structure in which the components are interspersed with one another all over or in which one is dispersed in another.

In FIGS. 3 and 4 the die lips at the exit 27 rotate relative to each other. The shear at the exit can introduce tensions which can make the control of the extruded film "bubble" difficult if the rheological properties of the material or materials are unfavourable.

The embodiment shown in FIG. 5, takes care of this difficulty since it allows the two parts 24 and 25 to rotate at the same velocity (and in the same direction).

This is achieved by means of a ringformed insert fixed through several supports of which one 36 is shown. There is hereby established a driving shear between the insert 35 and each of the parts 24 and 25. The insert is shown supplied with the vanes 37.

There can also, or alternatively, be vanes on the inlet orifice surfaces of 24 and 25 or all vanes (corrugations) can be omitted. There are preferably fed one or several strands of material on each side of the insert 35.

This drawing further shows the bearings 38 and gearwheels 39 for each of the dieparts 24 and 25.

Further improvements can be achieved if the insert 35 is made rotable, e.g. through teeth and bearings at its outer circumference. A high distributing and pumping effect can thereby be obtained through fast rotation of the insert, while the rotation of 24 and 25 can be slow to facilitate the take-off of the tube. It is even possible to make parts 24 and 25 fixed, by which the construction is facilitated. However, the distribution will generally hereby be much less even.

In each of the drawings the extrusion through the circular die takes place inwardly from the outer cicumference. This facilitates the feeding when the material(s) are viscoelastic. However, with suitable feeding means such as rollers or scrapers, the feeding can also take place into an inlet orifice at one of the ends of the cylindrical or disk-formed dieparts, or even from the inner circumference.

Further there has been shown a free space between the feeding extrusion device and the rotating material in the inlet orifice. This is also generally advantageous especially when the material is viscoelastic, but is not necessary.

The drawings have been described particularly in connection with extrusion of molten thermoplastic polymer material for tubular items (e.g. sheeting). However, with suitable feeding and take-up means it will also be advantageous for extrusion of other materials in a plastic state. Thus, as an example, one or several polymer solutions can be extruded to form a twisted yarn of filaments through a circular arrangement of orifices. The filaments can be solidified by drying or in a coagulation bath. Depending on the arrangement, there can be extruded mono- or multilayered filaments and/or filaments of different composition.

As a second example of special uses, the invention can be used for extrusion of pipes from inorganic fibres held together by curable prepolymers or the like. The pumping means in direct connection with the shaping of the pipe is very advantageous in such highly thixotropic materials.

As a third example the invention will be useful in connecton with extrusion of glass, e.g. coextrusion of differently coloured glass to obtain special effects, or extrusion of glass with metal fibres or other higher melting fibres as reinforcement.

As a fourth example the invention will be suitable in connection with extrusion of so called plastic metal.

As a fifth example the invention will be suitable in connection with extrusion of clay, cement and the like e.g. reinforced with fibres.

As a sixth example the invention will be suitable in connection with extrusion of bread-like foodstuff, e.g. for coextrusion of viscous sugar solution and dough which is subsequently baked.

As a seventh example the invention will be suitable for the extrusion of meat-like structures, from highly viscous, dissolved or swollen protein, e.g. coextruded with a viscous sugar solution, caramel and/or dough. The coextrudate is subsequently solidified.

What I claim is:

1. A method of extruding a continuous or discontinuous tubular sheet from an extrudable plastic material which comprises the steps of feeding said extrudable material to a rotatable extrusion die having there on an exposed, exteriorly accessible generally continuous circular inlet channel by laying in pressure-free fashion at least one continuous stream of said extrudable material said channel along a generally tangential path while rotating said die and channel about the channel axis to lay said stream in spiral fashion within said channel, said die having at one end spaced from said channel a continuous or discontinuous generally circular extrusion orifice in communication with the bottom of said channel through a continuous or discontinuous circular passageway, applying pressure against the material spiraled in said channel downstream of the tangential point of delivery by means associated with said channel and operative upon rotation of said channel about its axis to advance the material through said die and out of said orifice, and collecting the thus extruded sheet.

2. A method according to claim 1 in which said pressure is applied by rolling action against the material spiraled in the inlet channel.

3. A method according to claim 1 in which said pressure is applied by scraping action against the material spiraled in the inlet channel.

4. A method according to claim 1 in which at least the inlet channel of the die is formed by two spaced circular walls which rotate relative to each other to thereby produce a driving pressure against the material in the channel.

5. A method according to claim 4 in which the material has viscoelastic properties and the passageway is directed inwardly.

6. A method according to claim 4 in which a pumping action towards the exit is produced by means of a curved vane on the surface of at least one of said relatively rotating walls in engagement with the material, said vane being directed obliquely with respect to tangency.

7. A method according to claim 4 in which the die inlet channel, passageway and exit orifice are defined between two circular die parts which move relative to each other.

8. A method according to claim 1 in which an insert ring is disposed within said channel and applies a feeding pressure on the material therein.

9. A method according to claim 1 in which at least two different coextrudable materials are fed to the inlet channel as distinct strands and generally laminar flow is maintained through the die.

10. A method according to claim 9 in which said strands have been joined to one composite strand before delivery into the inlet channel.

11. A method according to claim 9 in which at least one strand of one of the materials is helically distributed and merged into one layer in the inlet channel and at least one stream of a different material is helically distributed and merged to a second layer in said channel, said layers being generally continuous both in the circumferential and the longitudinal direction of extrusion.

12. A method according to claim 11 in which the materials forming said adjacent layers are fed in alternate relationship at the boundaries between the layers to form ribformed, mutually interspersed extensions of each layer in said boundaries.

13. A method according to claim 7 wherein said relative rotation is accomplished by maintaining one circular die part in fixed position while rotating the other.

* * * * *

UNITED STATES PATENT OFFICE
CERTIFICATE OF CORRECTION

Patent No. 4,115,502          Dated September 19, 1978

Inventor(s) Ole-Bendt Rasmussen

It is certified that error appears in the above-identified patent and that said Letters Patent are hereby corrected as shown below:

In the Claims:

Column 7, line 13,   -- into -- should be inserted after "material".

Signed and Sealed this

Fourteenth Day of November 1978

[SEAL]

Attest:

RUTH C. MASON
Attesting Officer

DONALD W. BANNER
Commissioner of Patents and Trademarks